(12) United States Patent
Pifferi (10) Patent No.: US 12,365,552 B2
(45) Date of Patent: *Jul. 22, 2025

(54) PNEUMATIC TRANSPORT SYSTEM LANDING DEVICE

(71) Applicant: Wells Fargo Bank, N.A., San Francisco, CA (US)

(72) Inventor: Sean Pifferi, St. George, UT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,624

(22) Filed: Apr. 12, 2024

(65) Prior Publication Data

US 2024/0253914 A1    Aug. 1, 2024

Related U.S. Application Data

(63) Continuation of application No. 18/050,310, filed on Oct. 27, 2022, now Pat. No. 11,958,699.

(51) Int. Cl.
*B65G 51/30* (2006.01)
*B65G 51/20* (2006.01)

(52) U.S. Cl.
CPC ............ *B65G 51/30* (2013.01); *B65G 51/20* (2013.01)

(58) Field of Classification Search
None
See application file for complete search history.

(56) References Cited

U.S. PATENT DOCUMENTS

| 5,299,891 A | 4/1994 | Grosswiller |
| 5,918,764 A | 7/1999 | Bustos et al. |
| 6,146,057 A | 11/2000 | Gramley |
| 8,366,353 B2 | 2/2013 | Scott |

(Continued)

FOREIGN PATENT DOCUMENTS

| CN | 203294796 U | 11/2013 |
| KR | 20010022304 A | 3/2001 |

(Continued)

OTHER PUBLICATIONS

Aerocom USA & Canada, "OES Station", Aerocom Systems, Inc., 2023, 2 pp., Retrieved from the Internet on Feb. 13, 2023 from URL: https://www.aerocomusa.com/products/oes-station/.

(Continued)

*Primary Examiner* — William R Harp
(74) *Attorney, Agent, or Firm* — Shumaker & Sieffert, P.A.

(57) ABSTRACT

In some examples, a landing device is configured to be disposed within a container receptacle of a pneumatic transport system, the landing device comprising: a landing platform defining a landing surface for a container of the pneumatic transport system, the landing platform comprising: a first material configured to at least partially deform in response to the container impacting the landing surface; and a second material disposed over the first material, the second material configured to facilitate removal of the container from the container receptacle; and a base mechanically connected to a second surface of the landing platform, the base configured to secure the landing device to the container receptacle, wherein the landing device is configured to be inserted into the container receptacle without removing one or more components of the container receptacle.

20 Claims, 6 Drawing Sheets

(56) References Cited

U.S. PATENT DOCUMENTS

| | | |
|---|---|---|
| 10,354,476 B2 | 7/2019 | Jones et al. |
| 10,843,879 B2 | 11/2020 | Archambault |
| 10,913,618 B2 | 2/2021 | Dahl et al. |
| 11,958,699 B1 | 4/2024 | Pifferi |
| 2013/0279993 A1 | 10/2013 | Castro |

FOREIGN PATENT DOCUMENTS

| | | |
|---|---|---|
| WO | 9905054 A1 | 2/1999 |
| WO | 2020142037 A1 | 7/2020 |

OTHER PUBLICATIONS

Prosecution History from U.S. Appl. No. 18/050,310, now issued U.S. Pat. No. 11,958,699, dated Jul. 7, 2023 through Dec. 26, 2023, 56 pp.

Wang et al., "Research on the Ideal Cushion Method of Pneumatic Cylinder", Applied Mechanics and Materials, vol. 779, Nov. 6, 2014, pp. 68-73.

PNEUMATIC TRANSPORT SYSTEM LANDING DEVICE

This application is a continuation of U.S. patent application Ser. No. 18/050,310, filed Oct. 27, 2022 and entitled "PNEUMATIC TRANSPORT SYSTEM LANDING DEVICE," the entire contents of which is incorporated herein by reference.

TECHNICAL FIELD

The present technology is related to pneumatic transport systems.

BACKGROUND

Pneumatic transport systems include a plurality of container receptacles. The plurality of container receptacles are connected via a plurality of tubes. Containers may be transported from one container receptacle to another container receptacle via introduction of a high-pressure air to push and/or pull the containers between container receptacles through the plurality of tubes.

SUMMARY

The present disclosure describes landing devices configured to be disposed within container receptacles of pneumatic transport systems. In some examples, as a container enters into a container receptacle of a pneumatic transport system, the container impacts a portion of the container receptacle. The impact may generate a loud sound which may hamper communications of one or more nearby persons. The impact may also potentially damage the container and/or the items inside and/or create increased wear on the components of the container receptacle.

The landing devices described in this disclosure may reduce the sound output and/or damage to the container receptacles of a pneumatic transport system by at least partially absorbing the impact of a container on the container receptacles. The impact may be absorbed by a landing device that includes elements configured to absorb the impact energy of the container, e.g., by partially deforming in response to the impact by the container. One benefit of the landing device described in this disclosure is that the landing device may be installed within a container receptacle of a pneumatic transport system without removing any components from the container receptacle and/or make any other modifications of the container receptacle.

In some examples, the disclosure describes a landing device configured to be disposed within a container receptacle of a pneumatic transport system, the landing device comprising: a landing platform defining a landing surface for a container of the pneumatic transport system, the landing platform comprising: a first material configured to at least partially deform in response to the container impacting the landing surface; and a second material disposed over the first material, the second material configured to facilitate removal of the container from the container receptacle; and a base mechanically connected to a second surface of the landing platform, the base configured to secure the landing device to the container receptacle, wherein the landing device is configured to be inserted into the container receptacle without removing one or more components of the container receptacle.

In some examples, the disclosure describes a system comprising: a pneumatic transport system comprising: an air pump; a plurality of container receptacles, each container receptacle configured to accept a container delivered via the pneumatic transport system; and a plurality of tubes connecting the air pump and the plurality of container receptacles; and a landing device disposed within at least one container receptacle of the plurality of container receptacles, the landing device comprising: a landing platform defining a landing surface for the container, the landing platform comprising: a first material configured to at least partially deform in response to the container impacting the landing surface; and a second material disposed over the first material, the second material configured to facilitate removal of the container from the at least one container receptacle; and a base mechanically connected to a second surface of the landing platform, the base configured to secure the landing device to the at least one container receptacle, wherein the landing device is configured to be inserted into the at least one container receptacle without removing one or more components of the at least one container receptacle.

In some examples, the disclosure describes a method comprising: shaping a first material into a landing platform of a landing device, wherein the landing device is configured to be disposed within a container receptacle of a pneumatic transport system, wherein the landing platform defines a landing surface, and wherein the first material is configured to at least partially deform in response to a container impacting the landing surface; applying a second material over the landing surface, wherein the second material is configured to facilitate removal of the container from the container receptacle; and connecting a base to a second surface of the landing device, wherein the base is configured to secure the landing device to the container receptacle, wherein the landing device is configured to be inserted into the container receptacle without removing one or more components of the container receptacle.

The details of one or more examples are set forth in the accompanying drawings and the description below. Other features, objects, and advantages will be apparent from the description and drawings, and from the claims.

BRIEF DESCRIPTION OF THE DRAWINGS

Reference is made to the attached drawings, wherein elements have the same reference numeral designations represent similar elements throughout.

DETAILED DESCRIPTION

Pneumatic transport systems are used to transport items (e.g., within containers) from a first location to a second location by controlling air pressure within the system. Pneumatic transport systems include a plurality of container receptacles interconnected via a plurality of tubes. Each of the plurality of container receptacles may be accessible by an operator to retrieve and/or deposit items within the system. The operator may introduce a high-pressure air source into the pneumatic transport system to deliver containers to other locations within the system and/or retrieve items from the other locations within the system.

Pneumatic transport systems are used in a variety of circumstances, including, but not limited to, drive-through stations (e.g., for banks), transporting of samples, transference of items to a centralized location (e.g., from salespeople to a centralized room in a retail store), waste disposal, or manufacturing. In some examples, such as with a drive-through station, an operator may be next to a container receptacle and may operate the container receptacle (e.g., via one or more switches, buttons, or the like) to transport containers (also referred to as "carriers") to and/or from the container receptacle via introduction of high-pressured air into the pneumatic transport system. As a container enters a container receptacle, the container may impact a portion of the container receptacle (e.g., a container receiving platform), which stops movement of the container and positions the container within the container receptacle for retrieval by the operator or one or more other persons (e.g., the customer).

As a container enters into the container receptacle, the container impacts a portion of the container receptacle. The impact may generate a loud sound which may hamper communications of one or more nearby persons (e.g., between operators or between the operator and the customer via a microphone and speaker system). The impact may also potentially damage the container and/or the items enclosed within the container. The impact may further create increased wear on the components of the container receptacle.

The landing devices described in this disclosure may reduce the sound output and/or damage to the container receptacles of a pneumatic transport system by at least partially absorbing the impact of a container on the container receptacles. The impact may be absorbed by a landing device that includes elements configured to absorb the impact energy of the container, e.g., by partially deforming in response to the impact by the container. One benefit of the device described in this disclosure is that the device may be installed within a container receptacle of a pneumatic transport system without removing any components from the container receptacle and/or making any other modifications of the container receptacle.

Figure 1:
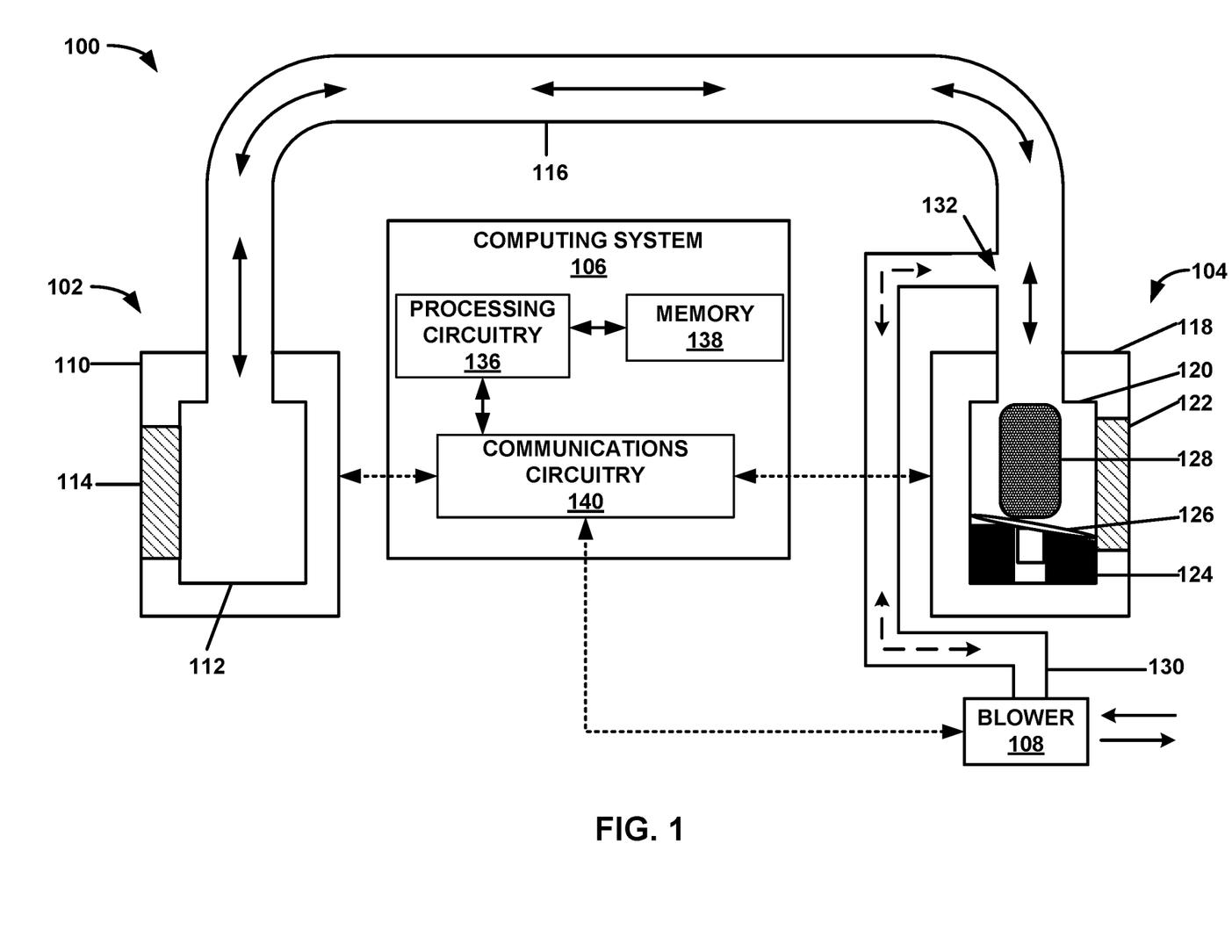
FIG. 1 is a conceptual diagram illustrating an example pneumatic transport system.

FIG. 1 is a conceptual diagram illustrating an example pneumatic transport system 100. Pneumatic transport system 100 may include a first station 102 and a second station 104 connected by tube(s) 116. Pneumatic transport system 100 may also include a blower 108 connected to one or more of first station 102, second station 104, and/or tube(s) 116. First station 102, second station 104, and blower 108 may be in communication (e.g., wired communication and/or wireless communication) with computing system 106.

In some examples, as illustrated in FIG. 1, pneumatic transport system 100 includes two stations (i.e., first station 102 and second station 104). In other examples, pneumatic transport system 100 include three or more stations. Pneumatic transport system 100 includes one or more sending stations and one or more receiving stations. A sending station may be configured to transfer a container 128 out of the sending station and into a receiving station. Each of the stations may alternate between a sending station and a receiving station based on an intended path of travel of container 128 within pneumatic transport system 100. For example, when a user sends container 128 from first station 102 to second station 104, first station 102 is the sending station and second station 104 is the receiving station, and vice versa.

First station 102 may include first container receptacle 110 defining a chamber 112. Chamber 112 may be dimensioned to retain container 128 within chamber 112 and to facilitate insertion and/or removal of container 128 from within chamber 112. Chamber 112 may include an opening connected to tube(s) 116. The opening may facilitate fluid communication between chamber 112 and tube(s) 116 and may facilitate movement of container 128 from chamber 112 into tube(s) 116 and vice versa.

A user may access chamber 112 via door 114. Door 114 may be configured to withstand the pressure of high-pressured air used to push and/or pull container 128 within pneumatic transport system 100. Door 114 may be at least partially transparent and may allow the user to visually inspect chamber 112 while door 114 is closed. First container receptacle 110 may lock door 114, e.g., in response to user input (e.g., via one or more buttons, switches, or the like disposed on container receptacle 110) and/or in response to instructions from computing system 106. In some examples, door 114 may remain locked while high-pressured air is present within one or more of tube(s) 116 and/or one or more stations of pneumatic transport system 100.

Second station 104 may include second container receptacle 118 which includes chamber 120 accessible via door 122. Chamber 120 may include an opening in fluid communication with tube(s) 116. Second container receptacle 118 may include container receiving platform 124 disposed within chamber 120. Container receiving platform 124 may receive impact of container 128 as container 128 enters second container receptacle from tube(s) 116. In some examples, container receiving platform 124 may at least partially deform in response to the impact from container 128. In some examples, as illustrated in FIG. 1, container receiving platform 124 may include a recess, wherein the recess is configured to facilitate the partial deformation of container receiving platform 124 in response to impact from container 128. Container receiving platform 124 may be partially slanted to facilitate removal and/or insertion of container 128 into chamber 120.

As container 128 impacts container receiving platform 124, the impact may generate a loud noise and/or may potentially damage container 128 and/or second container receptacle 118. A landing device 126 may be disposed within chamber 120 to further dampen the impact of container 128 and/or reduce noise generated by the impact.

Landing device 126 may include a landing platform disposed over at least a portion of the outer surface of the container receiving platform 124. The landing platform may include an outer coating that reduces friction between the landing platform and container 128. Landing device 126 may be secured within chamber 120 via a base disposed within the recess within container receiving platform 124.

Landing device 126 may be installed within chamber 120 without removing and/or modifying any components of second container receptacle 118. In some examples, landing device 126 may be installed within chamber 120 by aligning the base of landing device 126 within the recess of container receiving platform 124 and inserting the base of landing device 126 into the recess.

Blower 108 may transmit air into and/or out of pneumatic transport system 100. Blower 108 may be in fluid communication with tube(s) 116 via air source tube 130. Blower 108 may include, but is not limited to, air compressors, air pumps, or the like. Air source tube 130 may be connected to tube(s) 116 at connection point 132. In some examples, blower 108 may suck air from within tube(s) 116 to create a zone of reduced air pressure in front of container 128 (e.g., relative to an intended direction of travel of container 128) to pull container 128 through tube(s) 116. In some examples, blower 108 may blow air into tube(s) 116 to create a zone of increased air pressure behind container 128 (e.g., relative to an intended direction of travel of container 128) to push container 128 through tube(s) 116. In some examples, as illustrated in FIG. 1, air source tube 130 is connected to tube(s) 116 at a single connection point 132. In other examples, one or more air source tubes 130 are connected to tube(s) 116 at two or more connection points. Connection point 132 may include one or more valves (not pictured) selectively actuated (e.g., by computing system 106) to manipulate container 128 within pneumatic transport system 100. Blowers 108 may be connected to tube(s) 116 at a plurality of connection points via a plurality of air source tubes and may selectively blow air into or suck air out of portions of tube(s) 116 to control air pressure in front of and/or behind container 128.

Tube(s) 116 may include one or more tubes connecting one or more stations of pneumatic transport system 100. Tube(s) 116 may be a cylindrical body defining an inner lumen in fluid communication with the stations within pneumatic transport system 100 and sized to receive container 128. Container 128 may have a diameter configured to minimize movement of air between a zone in front of container 128 and a zone behind container 128 while container 128 is disposed within tube(s) 116. In some examples, while container 128 is disposed within a chamber of container receptacle of a station (e.g., chamber 110 or chamber 120), an extension tube of tube(s) 116 (not pictured) may enter the chamber and surround container 128 before blower 108 is actuated to pull container 128 into tube(s) 116. The extension tube may have an inner diameter substantially similar to the inner diameter of the lumen of tube(s) 116. The extension tube may facilitate extraction of container 128 from the chamber, which may have a larger inner diameter and/or cross-sectional area than container 128.

In some examples, as illustrated in FIG. 1, pneumatic transport system 100 has two stations (e.g., first station 102 and second station 104) connected by a single tube 116. In other examples, pneumatic transport system 100 has three or more stations that are connected by two or more tubes 116. Each of tubes 116 may include one or more valves that may be actuated (e.g., by computing system 106) to form a pathway between a starting location of container 128 and an intended destination of container 128 within the pneumatic transport system 100.

Computing system 106 may include one or more components including, but not limited to, processing circuitry 136, memory 138, and communications circuitry 140. In some examples, the components of computing system 106 may be contained within a single computing device. In other examples, the components of computing system 106 may be contained in multiple computing devices, computing systems, and/or cloud computing environments.

The various circuitry may be, or include, programmable or fixed function circuitry configured to perform the functions attributed to respective circuitry. Memory 138 may store computer-readable instructions that, when executed by processing circuitry 136, cause pneumatic transport system 100 to perform various functions. Memory 138 may be a storage device or other non-transitory medium.

Processing circuitry 136 is configured to control functions of first station 102 (e.g., first container receptacle 110), second station 104 (e.g., second container receptacle 118), blower 108, and one or more other components of pneumatic transport system 100. Processing circuitry 136 may based on user input (e.g., from first container receptacle 110 and/or second container receptacle 118), retrieve and execute instructions to actuate blower 108 and one or more valves within pneumatic transport system 100 to blow air into and/or suck air from portions of tube(s) 116 to move container 128 within pneumatic transport system 100. In some examples, processing circuitry 136 may based on user input and/or sensor data (e.g., from one or more sensors (e.g., cameras, pressure sensors, visual sensors, or the like)), retrieve and execute instructions to lock one or more doors (e.g., door 114, door 122) while container 128 is moving within pneumatic transport system 100. In some examples, processing circuitry 136 may based on user input, retrieve and execute instructions to actuate one or more valves within tube(s) 116 to form a pathway between a starting location of container 128 and an intended destination of container 128.

Communications circuitry 140 may be in communication with first container receptacle 110, second container receptacle 118, and blower 108. Communications circuitry 140 may receive user inputs received by first container receptacle 110 and/or second container receptacle 118 and transmit the received user inputs to processing circuitry 136. Communications circuitry 140 may transmit instructions from processing circuitry 136 to first container receptacle 110, second container receptacle 118, blower 108, and/or one or more other components within pneumatic transport system 100 to perform one or more functions described herein.

Figure 2:
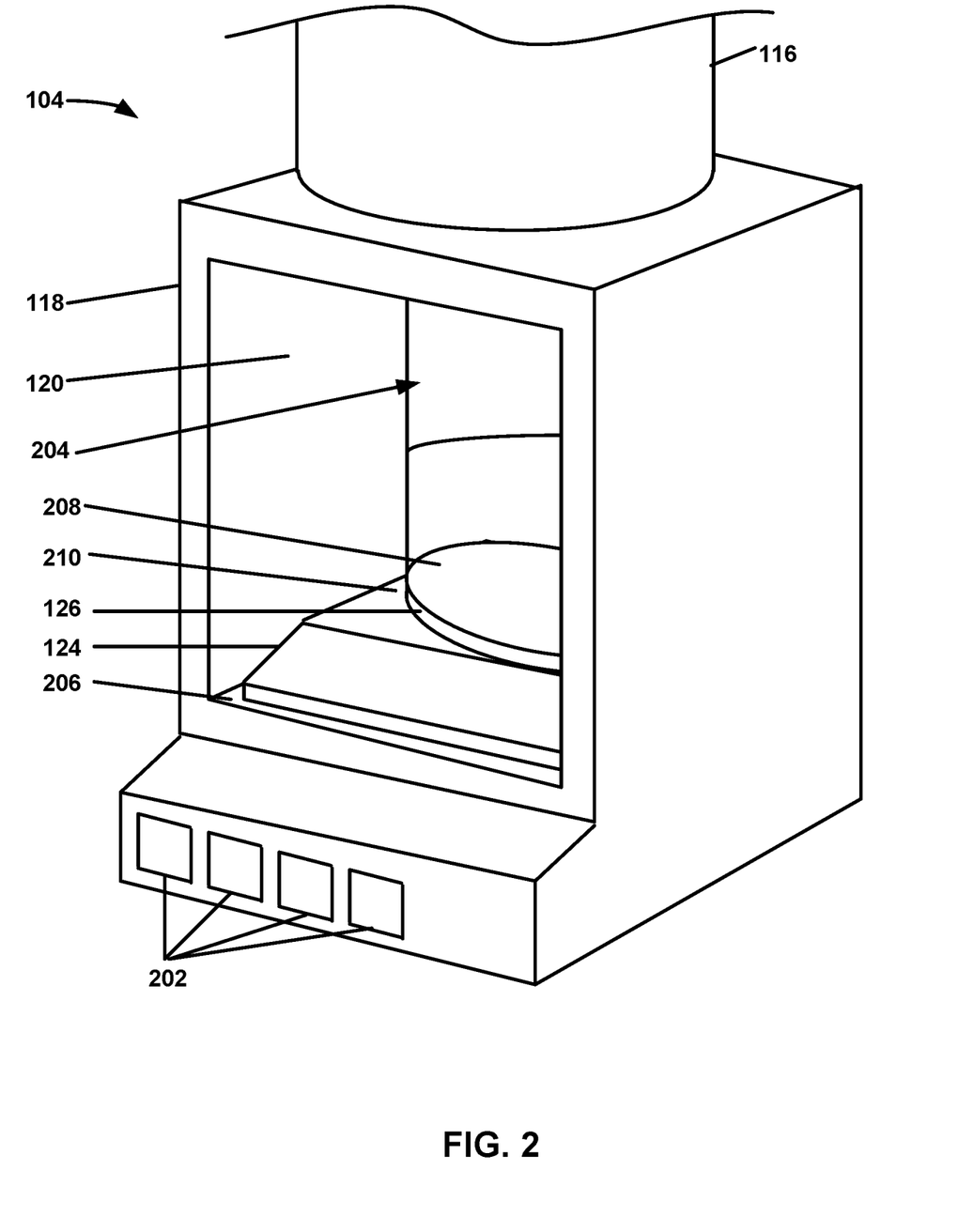
FIG. 2 is a conceptual diagram illustrating an example container receptacle of the pneumatic transport system of FIG. 1.

FIG. 2 is a conceptual diagram illustrating second station 104 of pneumatic transport system 100 of FIG. 1. Second station 104 includes second container receptacle 118 connected to tube(s) 116 and buttons 202 disposed on the housing of second container receptacle 118. A user may operate buttons 202 to transmit user inputs to computing system 106 to control transmission of container 128 (not pictured in FIG. 2) when inserted within second container receptacle 118 to another station or receive container 128 at second container receptacle 118 from another station. In other examples, instead of buttons 202, second container receptacle 118 may include levers, switches, knobs, or other components configured to receive instructions from the user.

Second container receptacle 118 includes chamber 120 having a channel 204 and surface 206. Channel 204 may be configured to receive container 128 and may be aligned with the inner lumen of tube 116, e.g., to facilitate movement of container 128 from and/or into channel 204 of chamber 120. In some examples, channel 204 defines a portion of chamber 120 sealed by a door (e.g., by door 122) while pneumatic transport system 100 is in operation. Surface 206 may define a base of chamber 204. In some examples, surface 206 includes one or more features configured to affix container receiving platform 124 to surface 206.

Container receiving platform 124 may be secured within chamber 120 and may define a receiving surface 210 configured to receive container 128 as container 128 enters chamber 120. In some examples, as illustrated in FIG. 2, container receiving platform 124 may taper from a base of container receiving platform 124 to a relatively flat receiving surface 210. In other examples, other shapes may be used for container receiving platform 124. In some examples, receiving surface 210 may be at an angle (e.g., at an angle that is greater than, less than, or equal to the angle of the taper to receiving surface 210.

Landing device 126 may be secured to container receiving platform 124 via a base of landing device 126 disposed within the recess within container receiving platform 124 (not pictured in FIG. 2). Landing device 126 may receive container 128 as container 128 enters chamber 120 and at least partially deform in response, e.g., to reduce the noise of the impact and/or damage to one or more components of second container receptacle 118 and/or to container 128. Landing device 126 may include landing platform 208 disposed on receiving surface 210. Landing platform 208 may be aligned with the inner lumen of tube 116 to facilitate disposal of container 128 directly onto landing platform 208. Landing platform 208 may have an oval, circular, rectangular, or other shape.

Figure 3A:
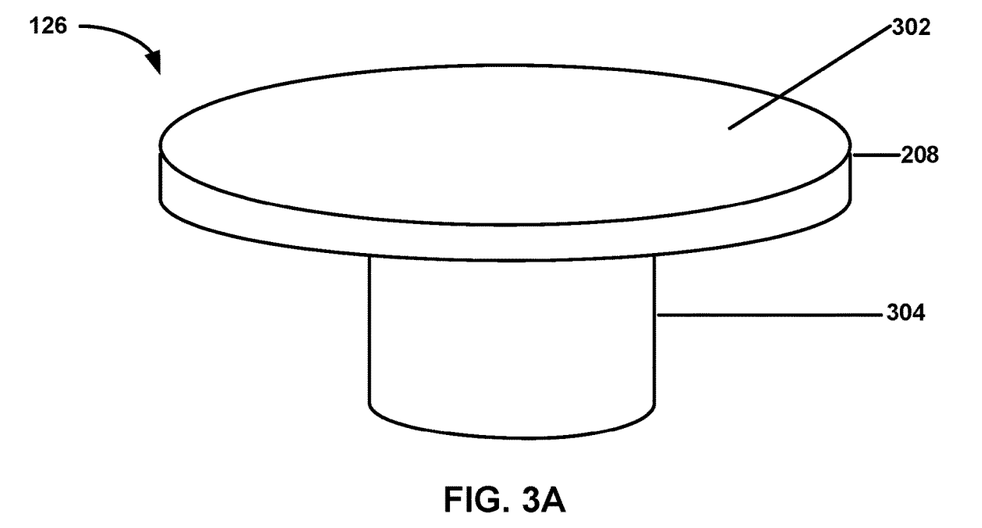
FIG. 3A is a conceptual diagram illustrating an example landing device of the pneumatic transport system of FIG. 1.
Figure 3B:
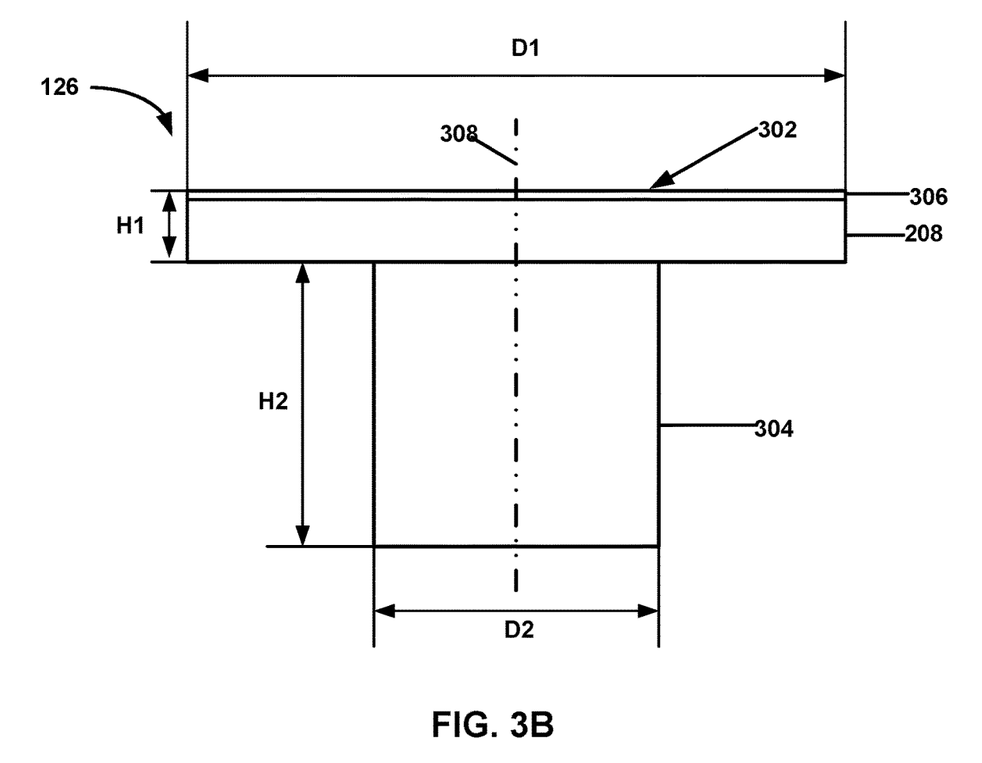
FIG. 3B is a conceptual diagram illustrating a side view of the landing device of FIG. 3A.

FIG. 3A is a conceptual diagram illustrating landing device 126 of the pneumatic transport system 100 of FIG. 1. FIG. 3B is a conceptual diagram illustrating a side view of landing device 126 of FIG. 3A. As illustrated in FIGS. 3A and 3B, landing platform 208 of landing device 126 may define a landing surface 302. Landing surface 302 may be configured to receive container 128 as container 128 impacts landing device 126. A base 304 of landing device 126 may be mechanically connected to landing platform 208 (e.g., to a face of landing platform 208 opposite of landing surface 302. Base 304 may be permanently and/or removably connected to landing platform 208.

Landing device 126 may be symmetrical about a longitudinal axis 308. When disposed within a chamber of a container receptacle (e.g., within chamber 120 of second container receptacle 118), longitudinal axis 308 may align with a longitudinal axis of the inner lumen of inner tube 116. As illustrated in FIG. 3B, landing platform 208 may be defined by a height (H1) and a diameter (D1) of landing platform 208. Base 304 may be defined by a height (H2) and a diameter (D2) of base 304.

Landing platform 208 may include one or more first materials configured to at least partially elastically deform in response to impact by container 128. The one or more first materials may include, but are not limited to, a rubber, a hardened foam, a polymer, or the like. A second material 306 may be disposed over landing platform 208 and form landing surface 302. Second material 306 may reduce friction between landing platform 208 and a base of container 128. In some examples, second material 306 has a lower coefficient of friction than receiving surface 210 of container receiving platform 124 and facilitates insertion and/or removal of container 128 into and/or out of chamber 120, respectively.

In some examples, landing platform 208 may include one or more springs disposed within the first material forming landing platform 208. The one or more springs may further dampen impact of container 128 on landing platform 208 and reduce the noise generated by the impact. As container 128 impacts landing platform 208, landing platform 208 may reduce velocity of container 128 and reduce the impact force of container 128 on one or more components of second container receptacle 118 (e.g., on container receiving platform 124).

Figure 3C:
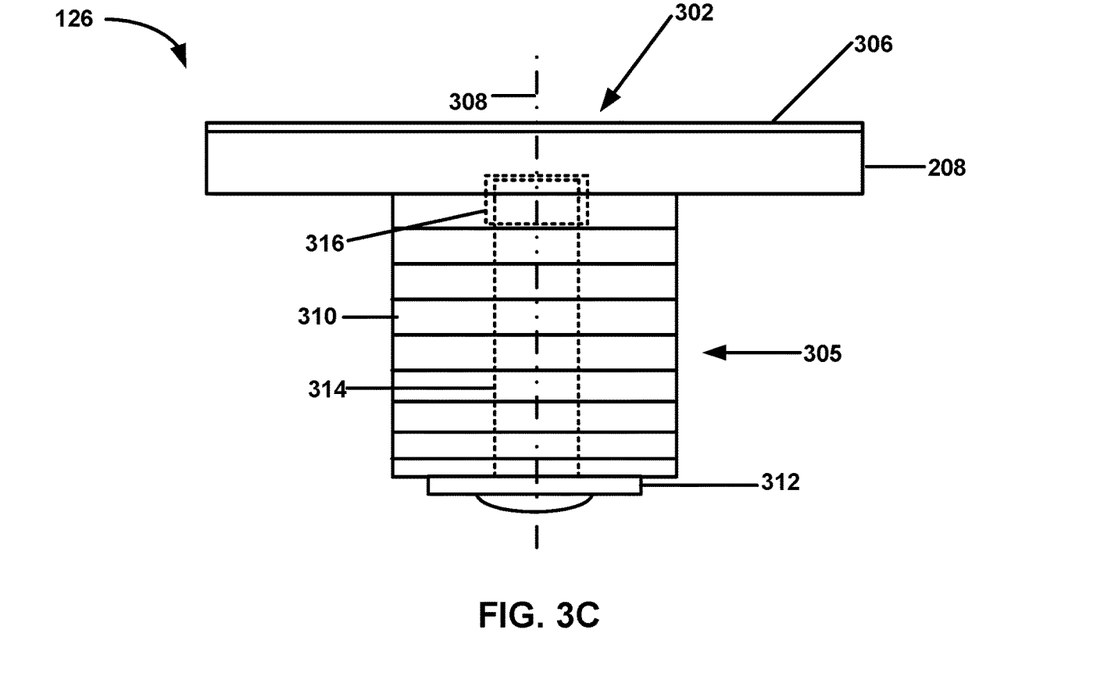
FIG. 3C is a conceptual diagram illustrating a side view of the landing device of FIG. 3A with an alternate base.

FIG. 3C is a conceptual diagram illustrating a side view of landing device 126 of FIG. 3A with an alternate base 305. Base 305 may include one or more blocks 310 secured to landing platform 208 via attachment member 314. Blocks 310 may be substantially similar in dimensions and may be added and or removed from landing device 126, e.g., to lengthen and/or shorten base 305, respectively. Attachment member 314 may be a screw, a bolt, or the like and may be removably connected to retaining member 316 disposed within landing platform 208. Each of blocks 310 may have an opening sized to receive attachment member 314. Blocks 310 may be retained by head 312 of attachment member 314. Head 312 may have a larger diameter than attachment member 314 or the openings within blocks 310 and retains blocks 310 between head 312 and landing platform 208. In some examples, as base 305 lengthens and/or shortens, attachment member 314 having a corresponding length is be used to secure blocks 310 to landing platform 208.

Figure 4A:
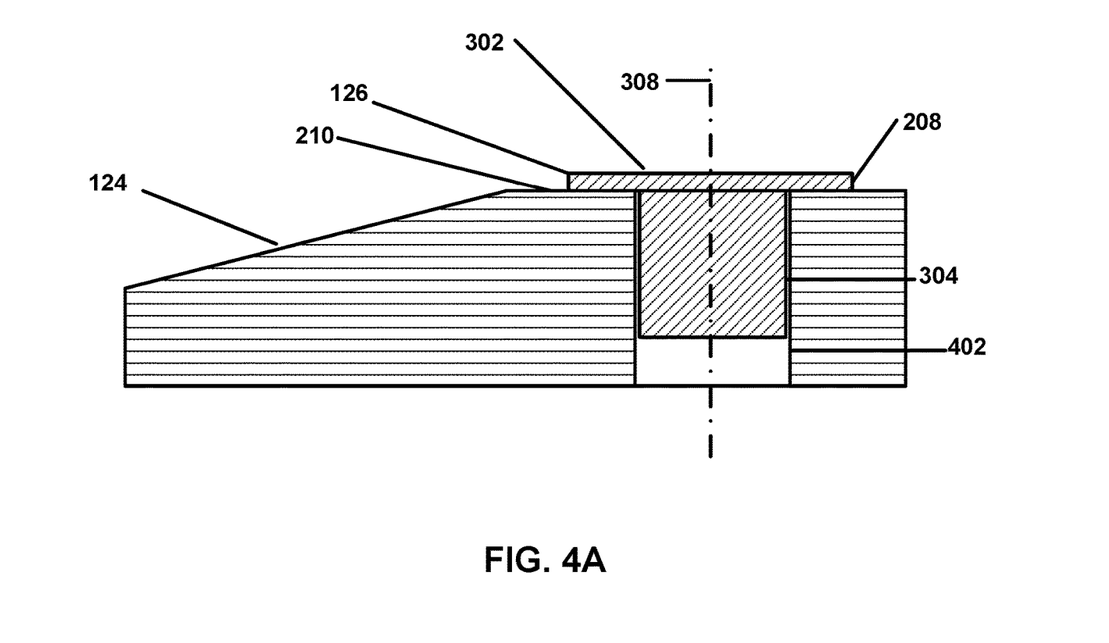
FIG. 4A is a conceptual diagram illustrating a side view of an example landing device installed within a recess in a container receiving platform.

FIG. 4A is a conceptual diagram illustrating a side view of landing device 126 installed within recess 402 in container receiving platform 124. While FIG. 4A illustrates landing device 126 with base 304 being disposed within recess 402, other example landing devices, e.g., landing device 126 with base 305, may be used. In some examples, as illustrated in FIG. 4A, recess 402 may extend from receiving surface 210 of container receiving platform 124 down to, e.g., surface 206 of chamber 120 (not pictured in FIG. 4A). In other examples, recess 402 may extend from receiving surface 210 along longitudinal axis 308 partially, but not entirely, towards surface 206. Base 304 may have a diameter D2 between about 1 millimeter (mm.) to about 5 mm. (e.g., between about 0.04 inches (in.) to about 0.02 in.) less than the diameter of recess 402. Base 304 may be sized such that base 304 would remain secure within recess 402 but may be easily removed by the user without the use of additional tools. Height H2 of base 304 may be less than a depth of recess 402. In some examples, height H2 of base 304 is between about 12.7 mm to about 25.4 mm (e.g., between about 0.5 in. to about 1 in.) less than the depth of recess 402. The height H2 of base 304 may be sufficiently large to maintain retention of landing device 126 within recess 402. The height H2 may be sufficiently small to avoid interference between base 304 and one or more other components within recess 402 and/or to reduce an amount of space in chamber 120 above recess 402 that is required to install landing device 126.

Figure 4B:
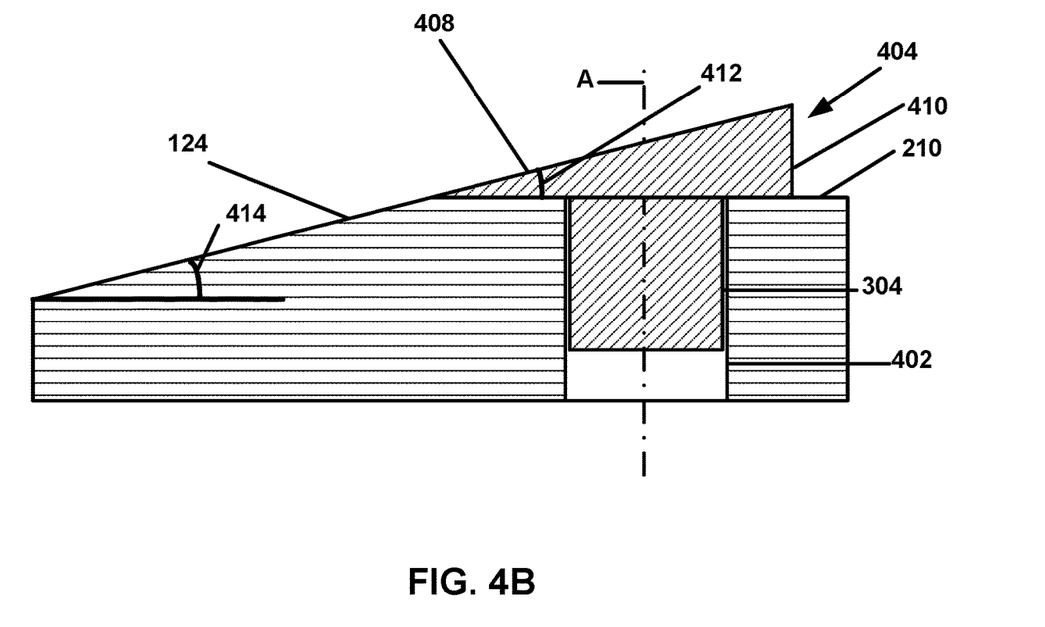
FIG. 4B is a conceptual diagram illustrating a side view of another example landing device installed within the recess in a container receiving platform.

FIG. 4B is a conceptual diagram illustrating a side view of another example landing device 404 installed within recess 402 in containing receiving platform 124. Landing device 404 includes an inclined landing platform 410. Landing platform 410 may include an inclined landing surface 408. The incline of landing surface 408 may be defined by angle 412, Angle 412 may be greater than, less than, or equal to angle 414 of container receiving platform 124. Angle 414 may define the angle of the taper of container receiving platform 124 to receiving surface 210. In some examples, angle 412 of landing platform 410 facilitates removal and/or insertion of container 128 into chamber 120, e.g., into channel 204 of chamber 120.

Figure 5:
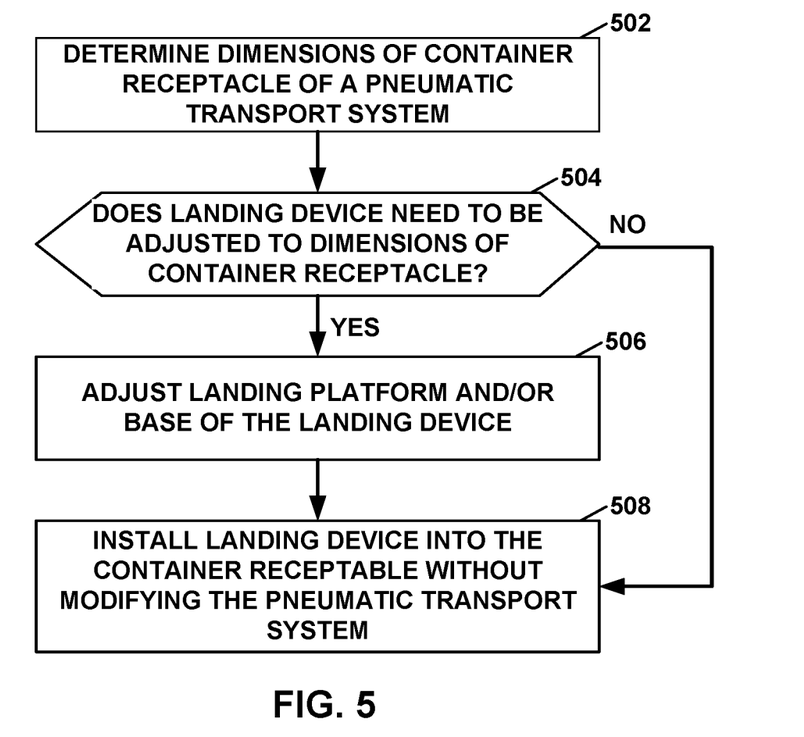
FIG. 5 is a flow diagram illustrating an example process of installing an example landing device.

FIG. 5 is a flow diagram illustrating an example process of installing an example landing device (e.g., landing device 126). While the example process illustrated in FIG. 5 is described primarily with reference to second container receptacle 118, the example process may be applied to other container receptacles (e.g., to first container receptacle 110) within an example pneumatic transport system.

A user may determine dimensions of a container receptacle (e.g., second container receptacle 118) of a pneumatic transport system 100 (502). Pneumatic transport system 100 may be an existing system installed into a building or the like. The user may determine the dimensions of a chamber of the container receptacle (e.g., chamber 120). The dimensions may include, but are not limited to, a height of chamber 120, a width of chamber 120, a depth of chamber 120, dimensions of channel 204 of chamber 120, a height of container receiving platform 124, or dimensions of recess 402 (e.g., depth of recess 402, diameter of recess 402) within container receiving platform 124.

The user may determine (e.g., based on the determined dimensions) whether landing device 126 needs to be adjusted to dimensions of second container receptacle 118 (504). The user may determine whether base 304 of landing device 126 may be inserted into recess 402 without any obstructions. The user may determine whether the area of landing platform 208 is sufficient such that landing platform 208 may be disposed within chamber 120 without issue and be of sufficient size to receive container 128 without having portions of container 128 contacting second container receptacle 118, container receiving platform 124, or the like. The user may determine whether a distance between landing surface 302 and a top surface of chamber 120 is sufficient to allow for removal and/or insertion of container 128 into chamber 120 without obstruction.

Based on a determination that landing device 126 needs to be adjusted ("YES" step of 504), the user may adjust landing platform 208 and/or base (e.g., base 304) of landing device 126 (506). The user may adjust landing platform 208 and/or base 304 by selecting a corresponding component with appropriate dimensions, removing the existing component from landing device 126, and installing the new component. In some examples, such as when the base is adjustable (e.g., base 305), the user may remove one or more of blocks 310 to adjust height H2 and/or diameter D2 of base 305 to correspond to the dimensions of recess 402.

Based on a determination that landing device 126 does not need to be adjusted ("NO" step of 504), the user may install landing device 126 into second container receptacle 118 without modifying pneumatic transport system 100 (508). The user may install landing device 126 into second container receptacle 118 by placing landing device 126 over container receiving platform 124 and inserting base 305 of landing device 126 into recess 402 of container receiving platform 124. Once inserted, landing device 126 may be removably and/or permanently connected to container receiving platform 124. Insertion of landing device 126 may not require removal, repositioning, and/or other modification of any components within second container receptacle 118 and pneumatic transport system 100.

Figure 6:
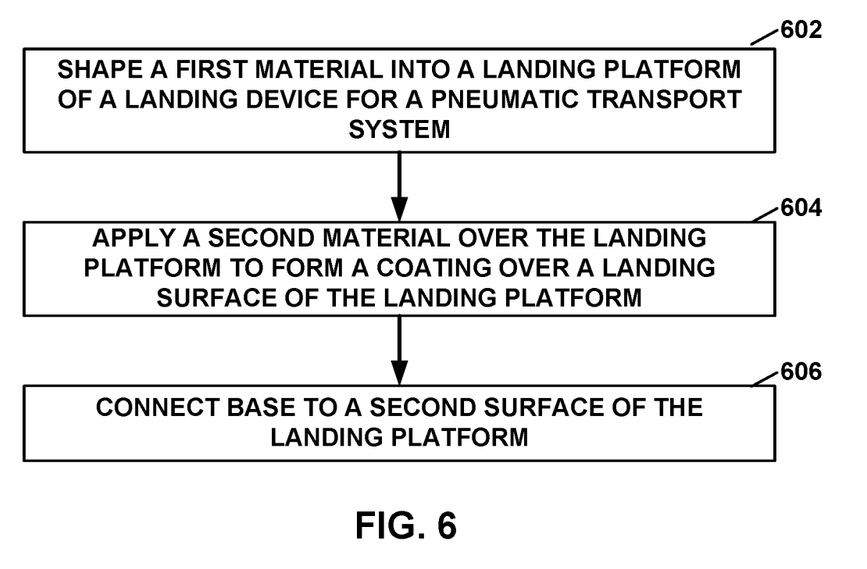
FIG. 6 is a flow diagram illustrating an example process of manufacturing an example landing device.

FIG. 6 is a flow diagram illustrating an example process of manufacturing an example landing device (e.g., landing device 126). A manufacturer may shape a first material into landing platform 208 of landing device 126 for pneumatic transport system 100 (602). The manufacturer may use one or more bladed instruments, laser instruments, and/or chemicals to remove portions of the first material from a piece of the first material to shape the piece of the first material into the desired shape for landing platform 208. The first material may be shaped into a flat shape (e.g., a disk-like shape). In some examples, the manufacturer may shape the first material to include an angle (e.g., angle 408).

The manufacturer may apply a second material over landing platform 208 to form a coating over a landing surface 302 of landing platform 208 (604). The coating may reduce friction of landing surface 302. The manufacturer may connect base 304 or 305 to a second surface of landing platform 208 (606). The second surface may be opposite to landing surface 302 on landing platform 208. Base 304 or 305 may be connected to landing platform 208 via one or more attachment members (e.g., attachment member 314 of base 305). Base 304 or 305 may be removably or permanently connected to landing platform 208.

The above detailed descriptions of examples of the technology are not intended to be exhaustive or to limit the technology to the precise form disclosed above. Although specific examples of the technology are described above for illustrative purposes, various equivalent modifications are possible within the scope of the technology, as those skilled in the relevant art will recognize. For example, while steps are presented in a given order, alternative examples may perform steps in a different order. The various examples described herein may also be combined to provide further examples. All references cited herein are incorporated by reference as if fully set forth herein.

From the foregoing, it will be appreciated that specific examples of the present disclosure have been described herein for purposes of illustration, but that various modifications may be made without deviating from the present disclosure.

Certain aspects of the present disclosure described in the context of particular examples may be combined or eliminated in other examples. Further, while advantages associated with certain examples have been described in the context of those examples, other examples may also exhibit such advantages, and not all examples need necessarily exhibit such advantages to fall within the scope of the present disclosure. Accordingly, the present disclosure and associated technology can encompass other examples not expressly shown or described herein.

Further, although techniques have been described in which a neuromodulation catheter is positioned at a single location within a single renal artery, in other examples, the neuromodulation catheter may be repositioned to a second treatment site within a single renal artery (e.g., proximal or distal of the first treatment site, may be repositioned in a branch of the single artery, may be repositioned within a different renal vessel on the same side of the patient (e.g., a renal vessel associated with the same kidney of the patient), may be repositioned in a renal vessel on the other side of the patient (e.g., a renal vessel associated with the other kidney of the patient), or any combination thereof. At each location where the neuromodulation catheter is positioned, renal neuromodulation may be performed using any of the techniques described herein or any other suitable renal neuromodulation technique or any combination thereof.

Moreover, unless the word "or" is expressly limited to mean only a single term exclusive from the other items in reference to a list of two or more items, then the use of "or" in such a list is to be interpreted as including (a) any single item in list, (b) all of the items in the list, or (c) any combination of the items in the list. Additionally, the terms "about" or approximately," when preceding a value, should be interpreted to mean plus or minus 10% of the value, unless otherwise indicated. Additionally, the term "comprising" is used throughout to mean including at least the recited feature(s) such that any greater number of the same feature and/or additional types of other features are not precluded.

Various aspects of the disclosure have been described. These and other aspects are within the scope of the claims.

What is claimed is:

1. A pneumatic transport system comprising:
a container receptacle comprising a housing defining a chamber and a recess disposed within the chamber; and
a landing device positioned within the chamber, the landing device comprising:
a landing platform configured to at least partially deform in response to a container impacting the landing platform, and
a base coupled to the landing platform, wherein the base is disposed within the recess of the container receptacle to secure the landing device within the chamber of the container receptacle, wherein a height of the base is adjustable.

2. The pneumatic transport system of claim 1,
wherein the container receptacle comprises a first container receptacle, wherein the pneumatic transport system further comprises:
a second container receptacle; and
a tube connecting the first container receptacle to the second container receptacle through which to transport containers, and
wherein the landing device dampens an impact caused by the container as the container enters the chamber of the first container receptacle from the second container receptacle via the tube.

3. The pneumatic transport system of claim 2, wherein the tube defines an inner lumen, and wherein the landing platform of the landing device positioned within the chamber of the container receptacle is at least aligned with the inner lumen of the tube.

4. The pneumatic transport system of claim 1, wherein the landing device is configured to be inserted into the chamber of the container receptacle without removing one or more components of the container receptacle.

5. The pneumatic transport system of claim 1,
wherein the container receptacle comprises a receiving platform disposed within the chamber and defining a receiving surface, and
wherein the recess extends at least partially from the receiving surface and through the receiving platform.

6. The pneumatic transport system of claim 5, wherein the landing platform of the landing device positioned within the chamber of the container receptacle is disposed over at least a portion of the receiving surface of the receiving platform of the container receptacle.

7. The pneumatic transport system of claim 1, wherein the base of the landing device is removably coupled to the container receptacle.

8. The pneumatic transport system of claim 1, wherein the landing platform comprises a spring configured to deform in response to receiving the impact from the container.

9. The pneumatic transport system of claim 1, wherein the landing platform is formed from one or more of a rubber or a hardened foam.

10. The pneumatic transport system of claim 1, wherein the base of the landing device comprises:
one or more blocks; and
an attachment member configured to secure the one or more blocks to the landing platform, wherein the attachment member comprises an elongated body extending from a first end to a second end and a head portion affixed to the second end of the elongated body,
wherein the height of the base is based on a number of the one or more blocks secured to the landing platform via the attachment member.

11. The pneumatic transport system of claim 1, wherein the height of the base is less than or equal to a depth of the recess of the container receptacle.

12. A method comprising:
determining a depth of a recess within a container receptacle of a pneumatic transport system;
adjusting a height of a base of a landing device based on the depth of the recess of the container receptacle, wherein the base is attached to a landing platform of the landing device; and
inserting the base of the landing device into the recess of the container receptacle, wherein when the base is disposed within the recess, the landing platform of the landing device defines a landing surface within the container receptacle and is configured to dampen an impact caused by a container as the container enters the container receptacle via the pneumatic transport system.

13. The method of claim 12, wherein the landing platform is configured to at least partially deform in response to the container impacting the landing surface.

14. The method of claim 12, wherein adjusting the height of the base comprises adjusting the height of the base of the landing device to be less than or equal to the depth of the recess of the container receptacle.

15. The method of claim 12,
wherein the base comprises:
one or more blocks, and
an attachment member comprising an elongated body extending from a first end to a second end and a head portion affixed to the second end of the elongated body, and
wherein adjusting the height of the base comprises:
selecting a number of blocks for the one or more blocks based on the depth of the recess; and
attaching the number of blocks to the landing platform via the attachment member.

16. The method of claim 15, wherein the attachment member comprises a screw or a bolt.

17. The method of claim 15,
wherein each block of the one or more blocks defines an opening extending through the respective block, and
wherein attaching the number of blocks to the landing platform via the attachment member comprises:
inserting the elongated body through the openings of the number of blocks; and
affixing the first end of the elongated body to the landing platform of the landing device to secure the number of blocks between the landing platform and the head portion of the attachment member.

18. The method of claim 12, wherein the landing platform comprises a spring configured to deform in response to receiving the impact from the container.

19. The method of claim 12, wherein the recess of the container receptacle defines a first inner diameter, and wherein an outer surface of the base of the landing device defines a second outer diameter, the second outer diameter being less than or equal to the first inner diameter.

20. The method of claim 12, wherein the base of the landing device is removably coupled to the landing platform of the landing device.

* * * * *